United States Patent
Campanile

[11] Patent Number: 6,105,445
[45] Date of Patent: Aug. 22, 2000

[54] METHOD OF OBTAINING AN ERROR SIGNAL IN A POSITIONING DEVICE

[75] Inventor: Lucio Flavio Campanile, Braunschweig, Germany

[73] Assignee: Deutsches Zentrum fur Luftund Raumfahrt e.V., Bonn, Germany

[21] Appl. No.: 09/027,096

[22] Filed: Feb. 20, 1998

[30] Foreign Application Priority Data

Feb. 20, 1997 [DE] Germany ............................ 197 06 706

[51] Int. Cl.⁷ .............................. G01B 7/14; G01M 19/00
[52] U.S. Cl. .......................................... 73/865.9; 700/188
[58] Field of Search ............................. 700/188; 73/865.9, 73/1.79; 33/502

[56] References Cited

U.S. PATENT DOCUMENTS

| | | | |
|---|---|---|---|
| 3,490,149 | 1/1970 | Bowers | 73/152.56 |
| 4,386,407 | 5/1983 | Hungerford | 700/188 |
| 4,562,392 | 12/1985 | Davis et al. | 318/572 |
| 5,385,217 | 1/1995 | Watanabe et al. | 188/267 |
| 5,478,043 | 12/1995 | Wakui | 248/550 |

FOREIGN PATENT DOCUMENTS

| | | | |
|---|---|---|---|
| 3442866A1 | 5/1986 | Germany | B23Q 15/22 |
| 4207998A1 | 9/1993 | Germany | B25J 9/00 |

*Primary Examiner*—Thomas P. Noland
*Attorney, Agent, or Firm*—Womble Carlyle Sandridge & Rice

[57] ABSTRACT

In a method of obtaining an error signal (15) in a positioning device (1), with which a tool (4) is positioned relative to target object (3), the tool's (4) acceleration in the direction of at least one of the tool's motion components is recorded with at least one sensor (10), and the target object's (3) acceleration in the direction of at least one of the target object's motion components, in which the tool's (4) acceleration is also recorded, is also recorded with at least one sensor (12). A differential signal is formed from the accelerations of the tool (4) and the target object (3).

14 Claims, 3 Drawing Sheets

1

METHOD OF OBTAINING AN ERROR SIGNAL IN A POSITIONING DEVICE

FIELD OF THE INVENTION

The invention refers to a method of obtaining an error signal in a positioning device, which is used for positioning a tool relative to a target object.

Here, the term positioning device covers all devices, in which motion of two or more objects takes place relative to each other under controlled conditions. One of these objects is called the tool, another the target object.

Positioning devices according to the above definition are used for various purposes, including measuring tasks, in which the tool is moved towards the target object, for example for measuring coordinates. Another field of application comprises production, assembly and repair operations, during which the tool is moved towards the target object, for example in order to carry out certain manipulation steps.

BACKGROUND OF THE INVENTION

Normally, positioning devices are realized in the form of a serial arrangement of simple component parts, each of these parts being allocated to one motion component. The direction of the motion components is determined by articulated connections for rotational motion components and by sled-like or telescopic connections for translational motion components.

Due to their structure, positioning devices are very susceptible to vibration. As a consequence of vibrations occurring, an undesired motion, opposing the purpose of the positioning device, is superimposed on the desired motion between tool and target object. For this reason, simple positioning devices in particular do often not fulfil high precision requirements. By active influence on vibrations of a positioning device, it should be principally possible to suppress vibrationally excited relative motion between the tool and the target object, at least to such a degree that the remaining negative effects become negligible. In the case of successful active influence on vibration, it would be possible to design the positioning devices in a more lightweight and cheaper and therefore more efficient manner. All elements, which are already present in a respective positioning device, and also additional elements can be used as active members for active influencing on vibration. Control of the active elements would have to be carried out by means of a control device, which requires information, if even possible in real time, about the vibrationally excited relative motion between tool and target object. This information should be available in the form of an error signal.

SUMMARY OF THE INVENTION

The invention refers to obtaining such an error signal and has the task to establish a concrete way for obtaining an error signal which is particularly suitable for active influencing on vibrations occurring in the positioning device.

DESCRIPTION OF THE INVENTION

The invention provides a method of obtaining an error signal in a positioning device with which a tool is positioned relative to a target object, the method comprising the steps of recording the tool's acceleration in the direction of at least one of the tool's motion components with at least one sensor; recording the target object's acceleration in the direction of at least one of the target object's motion components, in which the tool's acceleration is also recorded, with at least one sensor; and forming a differential signal from the accelerations of the tool and the target object.

According to the invention, obtaining the error signal is based on acceleration measurements. Thus, a measuring principle without reference point is applied, which shows no restrictions with respect to freedom of motion of the positioning device. The differential signal formed from the accelerations of the tool and the target object contains almost exclusively information about the undesired vibrationally excited relative motion between the tool and the target object. Further concentration of the differential signal on undesired vibrationally excited relative motions can be achieved through the isolation of low-frequency signal portions which, due to their low frequency, can no longer be related to the vibrationally excited relative motions.

For forming the differential signal, a direct difference between the accelerations of the tool and the accelerations of the target object can be formed. This difference is suitable as an error signal, since each vibrationally excited relative motion between the tool and the target object shows itself in the form of different accelerations of the tool and the target object.

If the direct difference between the accelerations of the tool and the accelerations of the target object are integrated once or twice in order to form the differential signal, different rates of the tool and the target object, or different distances covered by the tool and the target object, respectively, are indicated.

As an alternative, the distances covered by the tool and the target object can be determined using the accelerations of the tool and the target object, the difference between the distances covered by the tool and the target object being formed in a second step.

It has already been mentioned that, by obtaining the error signal in according to the invention, the error signal is concentrated on vibrationally excited relative motions. In addition it has been explained that, through isolation of low-frequency signal portions, further concentration on vibrationally excited relative motions can be achieved. In individual cases, however, it may be useful, for forming the differential signal, to subtract the accelerations, rates or distances, caused by a known macroscopic relative motion of the tool or the target object, from the accelerations, rates or distances of tool and target object or from a difference between the accelerations, rates or distances of the tool and the target object. The differential signal obtained in this manner only reflects vibrationally excited relative motions between the tool and the target object.

If it is not possible to record the acceleration of the tool and/or the target object exactly at the target position where the vibrationally exited relative motion of interest takes place, the acceleration of the tool and/or the target object can be recorded by at least two sensors arranged at a certain distance to the relevant target position per each component of motion and can be extrapolated on the assumption of a rigid body motion with respect to the target position.

For completely recording the rigid-body motions of tool and target object, the accelerations of the tool and the target object are to be recorded in three independent translational and three independent rotational directions each. If the relevant vibrationally excited relative motion takes place in only one or two components of motion, it is normally sufficient to only record the accelerations of the tool and the target object in the relevant directions of the rigid-body motion. Thus, the quantity of data for calculating the error signal is reduced from the beginning.

The error signal obtained in accordance with the invention is particularly well suited for actively influencing on vibrations of vibrationally excited motion states of a positioning device. The influence on the vibration in dependence on the error signal is to be carried out in such a manner that the error signal is reduced to zero.

In an arrangement for obtaining the error signal according to the invention it is possible to design a signal processing device, applied for realizing all the above-mentioned method variants for obtaining the error signal, by means of analog circuits.

It goes without saying that the sensors, used in the arrangement in accordance with the invention, require precise calibration and adjustment with respect to the motion components to be recorded, due to the relatively small value of the differential signal.

DETAILED DESCRIPTION OF THE PREFERRED EMBODIMENTS

Figure 1:
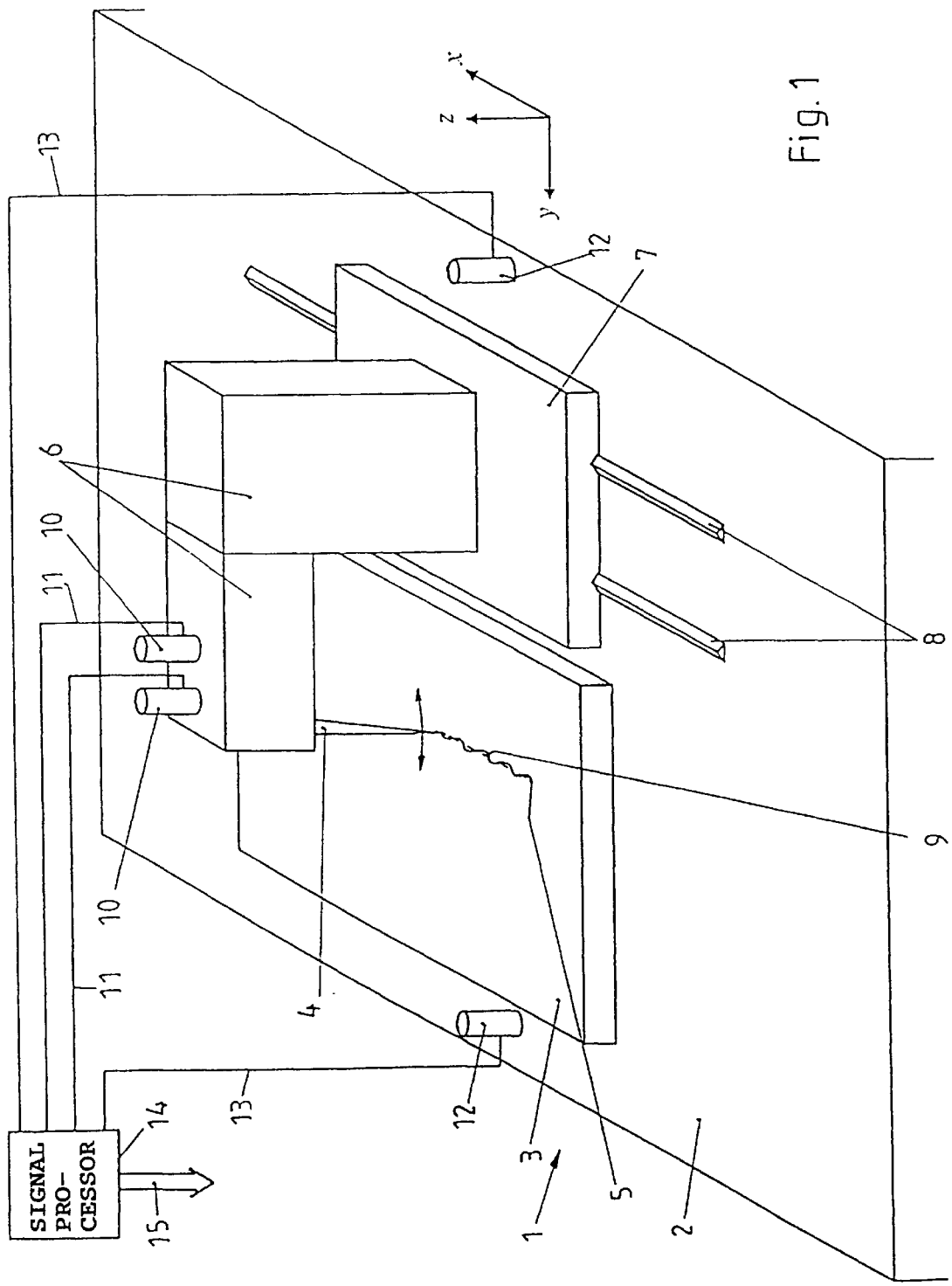
FIG. 1 shows a manufacturing machine for generating a groove in a plate.

A manufacturing machine 1, which is presented in FIG. 1, comprises a table 2, which supports a plate 3 as a workpiece. A knife 4 is provided for cutting a groove 5 in the plate 3. A knife holder 6, which is attached to a sled 7, is provided for guiding the knife 4. The sled 7 is guided by rails 8, provided on the table 2. The rails 8 run along a x-direction of a coordinate system x, y, z. A motion of the sled 7 along the rails 8 should result in a straight path 9 of the groove 5, as indicated by the dotted line. But a superimposed rotational vibration of the knife 4 around the x-axis results in a sinusoidal path of the groove 5 as presented. In order to oppose the resulting motion of the knife 4 relative to the plate 3, this motion must be recorded and an error signal must be generated therefrom. Since this cannot be done directly at the contact point of the knife 4 with the plate 3, two sensors 10 are arranged on the knife holder 6 close to the attachment point of the knife 4 to the knife holder 6. The sensors 10 record each acceleration of the knife holder 6 in direction of the z-axis of the coordinate system x, y, z. The difference of acceleration signals 11, recorded by two sensors 10, is a measure of the acceleration in the rotational direction of motion about the x-axis. On the assumption of a rigid-body motion, the motion of the knife 4 in the direction of the y-axis at the level of the plate 3 can be extrapolated from the acceleration signals 11. In order to record the exact relative motion of the knife 4 relative to the plate 3, two sensors 12 are also provided on the table 2. The sensors 12 record any acceleration of the table 2 also in the direction of the z-axis. The difference between acceleration signals 13 of the sensors 12 indicates the rotational motion of the table 2 and, thus, of the plate 3 about the x-axis. On the assumption of a rigid-body motion of the table 2 and the plate 3, the motion of the plate 3 in the direction of the y-axis at the contact point of the knife 4 can be extrapolated from the acceleration signals 12. A signal processing device 14 generates an error signal 15 from the acceleration signals 12 and 13, which reflects the difference between the motions of the knife 4 and the plate 3 in the direction of the y-axis. It is this difference, which is responsible for the fact that the groove 5 shows a sinusoidal path instead of the desired straight path 9. Conversely, the error signal 15 can be the basis for directly influencing the relative motion of the knife 4 with regard to the plate 3 in order to obtain the desired straight path 9 of the groove 5. For this purpose, active influence on vibration would have to be carried out in the manufacturing machine 1.

Figure 2:
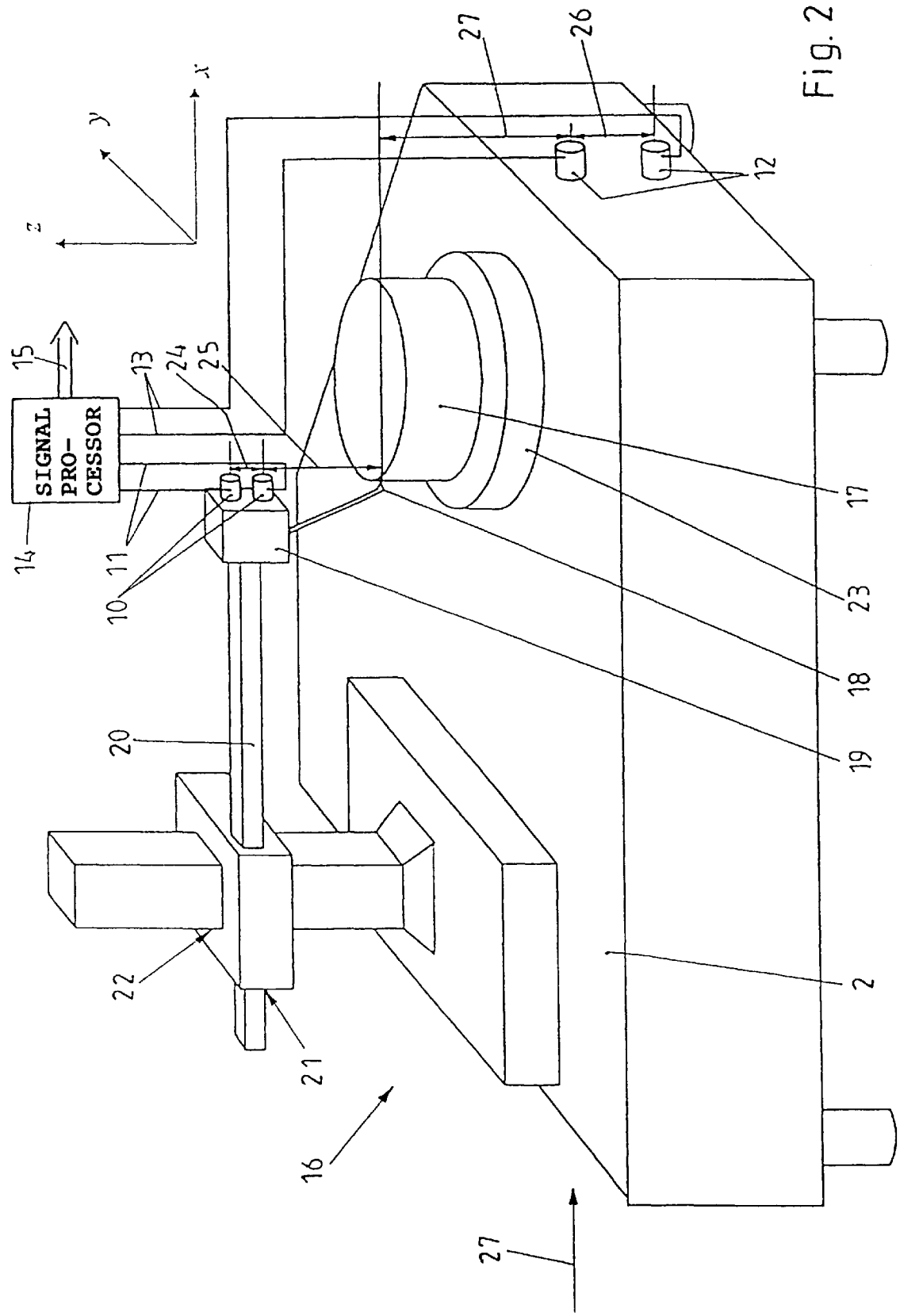
FIG. 2 shows a robot-like measuring device.

A robot-like measuring device 16, which is presented in FIG. 2, serves for determining deviations of a component part 17 from target dimensions. The measuring device 16 has a probe 18, which is applied to the component part 17 and attached to a supporting arm 20 via a distance measuring instrument 19. The supporting arm 20 can be moved by means of two sleds 21 and 22 relative to the table 2 in the direction of the x-axis and z-axis of the coordinate system x, y, z. A rotary table 23 for the component part 17 is arranged on the table 2, rotatable around the z-axis. Since the distance measuring instrument 19 records the paths of the probe 18 in the direction of the x-axis, preciseness of the measuring device 16 depends upon the relative motion occurring between the distance measuring instrument 19 and the component part 17, relative to the contact point of the probe 18 with the component part 17. For recording this relative motion, two sensors are provided on the distance measuring instrument 19 and two sensors 12 on the table 2. The sensors 10 record the accelerations of the distance measuring instrument 19 in the direction of the x-axis. The sensors 12 record accelerations of the table 2 in the same direction. On the assumption of a rigid-body motion, it is possible to extrapolate from acceleration signals 11 and 13 obtained from the sensors 10 and 12, respectively, to the corresponding acceleration in the x-direction at the contact point of the probe 18 with the component part 17. This acceleration cannot be recorded by a sensor which is directly arranged at the contact point. Signal processing device 14 determines the difference between the accelerations of the distance measuring device 19 and of the table 2, which have been extrapolated to the contact point of the probe 18 with the component part 17, whereby this difference is equated with the corresponding acceleration of component part 17. After this difference has been integrated twice, error signal 15 is generated, which directly indicates the current measuring error of measuring device 16.

Two acceleration sensors, manufactured by PCB, type 352 A (resolution $1 \times 10^{-4}$ g) are used as the sensors 10, which are arranged above each other at a vertical distance 24 of 80 mm. A distance 25 of the lower sensor 10 to the contact point of the probe 18 with the component part 17 is 50 mm. Two sensors, manufactured by PCB, type 393 A 03 (resolution $5 \times 10^{-6}$ g) are used as the sensors 12, the vertical distance of which is 100 mm. A vertical distance 27 of the upper sensor 12 to the contact point of the probe 18 with the component part 17 is 200 mm. The measuring device 16 can be exposed to an external broadband vibration excitation, for example in the direction of an arrow 27, by using an electrodynamic vibration system of RMS, Model SW 53.

Figure 3:
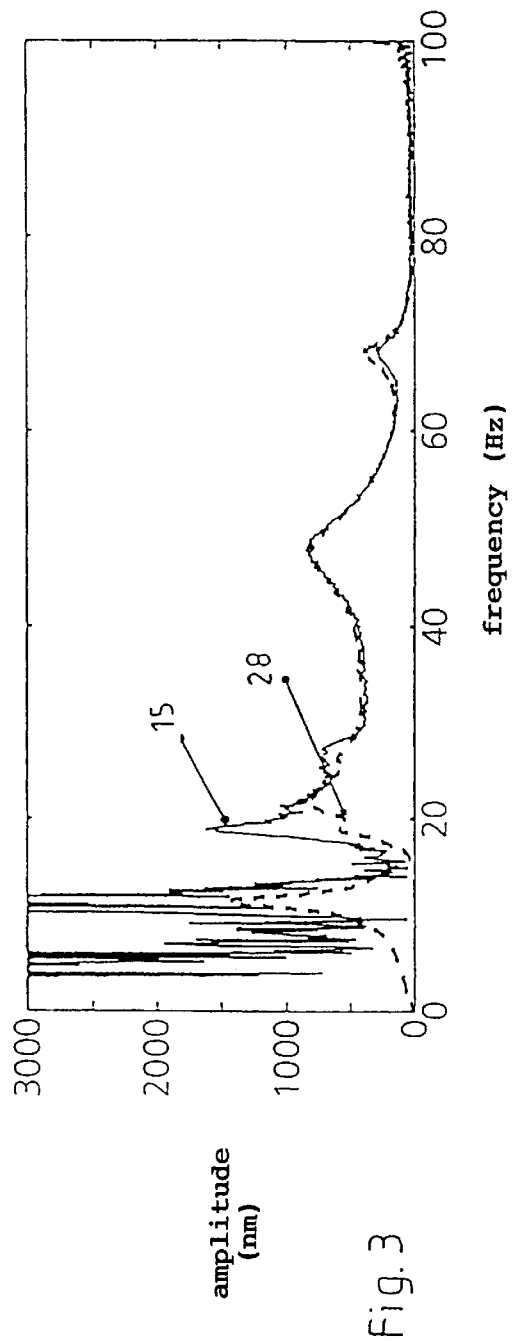
FIG. 3 shows a measuring signal and an error signal, which have been obtained in a positioning device
Figure 4:
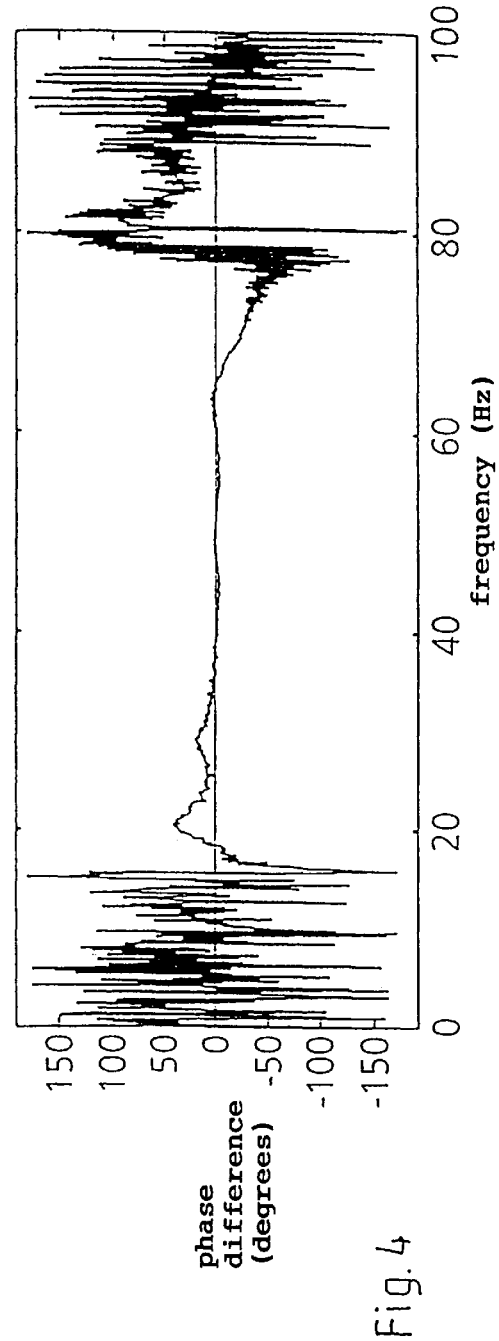
FIG. 4 shows the phase difference between the measuring signal and the error signal in accordance with FIG. 3.

FIGS. 3 and 4 show measuring results, which were obtained during external broadband excitation of a positioning device at a frequency range of 0 to 100 Hertz. The dotted line in FIG. 3 shows the amplitude of a measuring signal 28 and the continuous line shows the amplitude of an error signal 15 in relation to frequency. The measuring signal 28 was recorded with a distance measuring instrument and the error signal 15 was based on the acceleration signals obtained from two pairs of acceleration sensors, which, analogously to FIGS. 1 and 2, were allocated to the target object on the one hand and to the tool of the positioning device on the other. The phase difference of the measuring signal 28 and of the error signal 15 is shown in FIG. 4 in relation to frequency. Due to the testing conditions, the measuring signal 28 is solely caused by external excitation of the positioning device. This means that the measuring signal 28 is only based on vibrations excited between the distance measuring instrument 19 and the component part 17 and, apart from that, would have to be zero. This is confirmed by the error signal 15. In quantitative aspects, the error signal 15 shows for the entire range, in which the measuring signal 28 occurs and which is terminated at 70 Hertz, that the measuring signal 28 is based on a vibrationally excited relative motion of the distance measuring instrument 19 and the component part 17. With respect to quantity, the error signal shows almost exactly the same amplitude as the measuring signal 28 in the frequency range of 20 to 70 Hertz, which would also have been to be expected theoretically. In the frequency range of 0 to 20 Hertz, the amplitude of the error signal 15 deviates more from the amplitude of the measuring signal 28, which is caused by the difficulty to exactly determine, at these low frequencies, distances on the basis of acceleration signals. This is also documented by the phase difference shown in FIG. 4. While no appreciable phase difference between error signal 15 and measuring signal 28 is present in the frequency range of 20 to 70 Hertz, such a phase difference at varying size can be observed in the frequency range below 20 Hertz. But solely due to qualitative suitability of the error signal 15 for indicating the faulty measuring signal 28, active suppression of vibration is possible by using the error signal 15, so that negative effects of induced vibrations on measuring accuracy of the measuring device 16 can be suppressed.

REFERENCE LIST

1 - manufacturing machine
2 - table
3 - plate
4 - knife
5 - groove
6 - knife holder
7 - sled
8 - rail
9 - path
10 - sensor
11 - acceleration signal
12 - sensor
13 - acceleration signal
14 - signal processing device
15 - error signal
16 - measuring device
17 - component part
18 - probe
19 - distance measuring instrument
20 - supporting arm
21 - sled
22 - sled
23 - rotary table
24 - distance
25 - distance
26 - distance
27 - arrow
28 - measuring signal

What is claimed is:

1. A method of obtaining an error signal in a positioning device with which a tool is positioned relative to a target object, said method comprising the steps of:
   sensing the tool's acceleration in three independent translational and three independent rotational directions with at least one sensor,
   sensing the target object's acceleration in three independent translational and three independent rotational directions with at least one sensor, and
   forming a differential signal from the accelerations of the tool and the target object.

2. The method of claim 1, wherein, in the step of forming the differential signal from the accelerations of the tool and the target object, a direct difference between the accelerations of the tool and the accelerations of the target object is formed for forming the differential signal.

3. The method of claim 1, wherein, in the step of forming the differential signal from the accelerations of the tool and the target object, a direct difference between the accelerations of the tool and the accelerations of the target object is formed and integrated once or twice for forming the differential signal.

4. The method of claim 1, wherein, in the step of forming the differential signal from the accelerations of the tool and the target object, distances covered by the tool and the target object are determined using the accelerations of tool and target object, and a difference between these distances covered by the tool and the target object is formed for forming the differential signal.

5. The method of claim 1, wherein, in the step of forming the differential signal from the accelerations of the tool and the target object, the accelerations caused by a macroscopic relative motion of tool and target object are subtracted from the accelerations of the tool and the target object.

6. The method of claim 1, wherein in the steps of sensing the tool's and the target object's acceleration, the accelerations of the tool are sensed with at least two sensors arranged at a certain distance from a relevant target position per each component of motion, and that the accelerations are extrapolated on the assumption of a rigid body motion with respect to the target position.

7. The method of claim 1, and further comprising the step of actively influencing on vibrations of vibrationally excited motion states of a positioning device in dependence on the differential signal formed from the accelerations of the tool and the target object.

8. The method of claim 1 and where in the step of forming the differential signal from the accelerations of the tool and the target object, the rates caused by a macroscopic relative motion of tool and target object are subtracted from the rates of the tool and the target object.

9. The method of claim 1 and where in the step of forming the differential signal from the accelerations of the tool and the target object, the distances caused by a macroscopic relative motion of tool and target object are subtracted from the distances of the tool and the target object.

10. The method of claim 1 and where in the step of forming the differential signal from the accelerations of the tool and the target object, the accelerations caused by a macroscopic relative motion of tool and target object are subtracted from a difference between the accelerations of the tool and the target object.

11. The method of claim 1 and where in the step of forming the differential signal from the accelerations of the tool and the target object, the rates caused by a macroscopic relative motion of tool and target object are subtracted from a difference between the rates of the tool and the target object.

12. The method of claim 1 and where in the step of forming the differential signal from the accelerations of the tool and the target object, the distances caused by a macroscopic relative motion of tool and target object are subtracted from a difference between the distances of the tool and the target object.

13. The method of claim 1 and where in the steps of sensing the tool's and the target object's acceleration, the accelerations of the tool and the target object are sensed with at least two sensors arranged at a certain distance from a relevant target position per each component of motion, and the accelerations are extrapolated on the assumption of a rigid body motion with respect to the target position.

14. The method of claim 1 and where in the steps of sensing the tool's and the target object's acceleration, the accelerations of the target object are sensed with at least two sensors arranged at a certain distance from a relevant target position per each component of motion, and that the accelerations are extrapolated on the assumption of a rigid body motion with respect to the target position.

* * * * *